United States Patent
Kimura

(10) Patent No.: US 10,407,561 B2
(45) Date of Patent: Sep. 10, 2019

(54) ANTIOXIDANT

(71) Applicant: SUMITOMO CHEMICAL COMPANY, LIMITED, Tokyo (JP)

(72) Inventor: Natsuko Kimura, Osaka (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 17 days.

(21) Appl. No.: 15/752,348

(22) PCT Filed: Oct. 9, 2015

(86) PCT No.: PCT/JP2015/078835
§ 371 (c)(1),
(2) Date: Feb. 13, 2018

(87) PCT Pub. No.: WO2017/061057
PCT Pub. Date: Apr. 13, 2017

(65) Prior Publication Data
US 2019/0144633 A1    May 16, 2019

(51) Int. Cl.
| C08K 5/136 | (2006.01) |
| C08K 5/527 | (2006.01) |
| C08L 23/02 | (2006.01) |
| C09K 15/08 | (2006.01) |
| C08L 101/00 | (2006.01) |

(52) U.S. Cl.
CPC ............. *C08K 5/136* (2013.01); *C08K 5/527* (2013.01); *C08L 23/02* (2013.01); *C08L 101/00* (2013.01); *C09K 15/08* (2013.01)

(58) Field of Classification Search
CPC ......... C08K 5/136; C08K 5/527; C08L 23/02; C08L 101/00; C09K 15/08
USPC ....................................................... 524/428
See application file for complete search history.

(56) References Cited

U.S. PATENT DOCUMENTS

| 3,280,070 A | 10/1966 | Di Battista et al. |
| 3,281,505 A | 10/1966 | Spivak |
| 6,448,357 B1 | 9/2002 | Hamada et al. |
| 2009/0170987 A1 | 7/2009 | Kimura et al. |

FOREIGN PATENT DOCUMENTS

| JP | 11-222493 A | 8/1999 |
| JP | 2001-81250 A | 3/2001 |
| KR | 10-2008-0090341 A | 10/2008 |
| SU | 1642708 A1 | 10/1995 |

OTHER PUBLICATIONS

Communication dated Mar. 19, 2019, from the European Patent Office in counterpart European Application No. 15905875.9.
Dyubchenko et al., "Synthesis and inhibitory activity of alkyl(hydroxyaryl)amines", Russian Chemical Bulletin, International Edition, vol. 56, No. 6, pp. 1149-1155, Jun. 2007 (7 pages total).
Prosenko et al., "Synthesis and Antioxidant Properties of Bis[ω-(3,5-dialkyl-4-hydroxyphenl)alkyl] Sulfides", Russian Journal of Applied Chemistry, vol. 76, No. 2, 2003, pp. 248-252 (5 pages total).
Krysin et al., "Bis [3-(3,5-dialkyl-4-hydroxyphenyl)propyl] mono- and Disulfides as the Sevilen Stabilizers", Russian Journal of General Chemistry, 2011, vol. 81, No. 6, pp. 1159-1162 (4 pages total).
Communication dated Sep. 6, 2017 issued by the Korean Intellectual Property Office in counterpart application No. 10-2017-7014477.
International Search Report dated Dec. 22, 2015 issued by the International Searching Authority in No. PCT/JP2015/078835.
International Preliminary Report on Patentability with the translation of Written Opinion dated Apr. 10, 2018 issued by the International Bureau in No. PCT/JP2015/078835.

*Primary Examiner* — Josephine L Chang
(74) *Attorney, Agent, or Firm* — Sughrue Mion, PLLC

(57) ABSTRACT

The present invention relates to an antioxidant comprising a compound represented by formula (III):

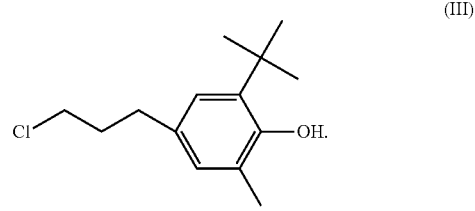

(III)

7 Claims, No Drawings

ANTIOXIDANT

CROSS REFERENCE TO RELATED APPLICATIONS

This application is a National Stage of International Application No. PCT/JP2015/078835 filed Oct. 9, 2015.

TECHNICAL FIELD

The present invention relates to an antioxidant.

BACKGROUND ART

A compound represented by formula (I) is known as antioxidants for thermoplastic polymers such as polyolefins (for example, Patent Document 1).

(I)

PRIOR ART DOCUMENTS

Patent Document

[Patent Document 1] JP 2001-81250 A

SUMMARY OF THE INVENTION

Problem to be Solved by the Invention

When resins such as thermoplastic polymers are processed at a high temperature, yellowing, formation of gel, and deterioration of the resins such as breakage of a polymer chain may occur. Thus, the conventional antioxidants as described in the aforementioned patent document 1 were not sufficient in improving stability of resins.

An object of the present invention is to provide an antioxidant which improves the stability of resins.

Means for Solving the Problem

The present invention includes the following inventions:
[1] An antioxidant comprising a compound represented by formula (III):

(III)

[2] The antioxidant according to the above item [1], additionally comprising a compound represented by formula (II):

(II)

wherein $R^1$, $R^2$, $R^4$ and $R^5$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms or a phenyl group; $R^3$ represents a hydrogen atom or an alkyl group having 1 to 8 carbon atoms; X represents a single bond, a sulfur atom or a >CH—$R^6$ group ($R^6$ represents a hydrogen atom, an alkyl group having 1 to 8 carbon atoms or a cycloalkyl group having 5 to 8 carbon atoms); A represents an alkylene group having 1 to 8 carbon atoms or a *—C(=O)—$R^7$— group ($R^7$ represents a single bond or an alkylene group having 1 to 8 carbon atoms, and * represents a bond on the side of oxygen); one of Y and Z represents a hydroxyl group, an alkoxy group having 1 to 8 carbon atoms or an aralkyloxy group having 7 to 12 carbon atoms, and the other represents a hydrogen atom or an alkyl group having 1 to 8 carbon atoms.

[3] The antioxidant according to the above item [2], comprising the compound represented by formula (III) in an amount of 0.005 to 10 parts by mass based on 100 parts by mass of the compound represented by formula (II).

[4] The antioxidant according to the above item [2] or [3], wherein the area of the compound represented by formula (III) is 0.01 to 5 given that the area of the compound represented by formula (II) is 100 in liquid chromatography measurement under the following conditions:

Measurement Conditions
Column: Sumipax ODS A-212 (6 mm φ×150 mm, diameter of filler: 5 μm)
Column temperature: 40° C.
Mobile Phase:
(Liquid A) 0.1 mass % of ammonium acetate/water
(Liquid B) 0.1 mass % of ammonium acetate/methanol
Mobile phase gradient: 0→20 minutes (Liquid A: 20→0 mass % (1 mass %/minute), Liquid B: 80→100 mass % (1 mass %/minute)), 20→45 minutes (Liquid A: 0 mass %, Liquid B: 100 mass %)
Flow rate: 1.0 mL/minute
Detection method: UV (280 nm)
Sample concentration: 5 mg/mL
Injection amount: 10 μL.

[5] The antioxidant according to any one of the above items [2] to [4], wherein the total amount of the compound represented by formula (II) and the compound represented by formula (III) is 90 parts by mass or more based on 100 parts by mass of the antioxidant.

[6] A thermoplastic polymer composition comprising the antioxidant according to any one of the above items [i] to [5], and a thermoplastic polymer.

[7] The thermoplastic polymer composition according to the above item [6], comprising the antioxidant according to any one of the above items [1] to [5] in an amount of 0.005 to 5 parts by mass based on 100 parts by mass of the thermoplastic polymer.

[8] The thermoplastic polymer composition according to the above item [6] or [7], wherein the thermoplastic polymer is a polyolefin.

[9] Use of the antioxidant according to any one of the above items [1] to [5] for improving stability of thermoplastic polymers.

Effect of the Invention

According to the present invention, an antioxidant which further improves the stability of resins can be provided.

DESCRIPTION OF EMBODIMENTS

The antioxidant of the present invention comprises a compound represented by formula (III) (hereinafter sometimes referred to as a "compound (III)"). Since it is possible to suppress yellowing or thermal deterioration of resins by adding the compound (III) to resins such as thermoplastic polymer, the compound (III) is suitable as an active component of an antioxidant for resins such as thermoplastic polymers.

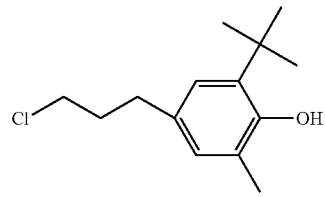

(III)

The compound (III) can be prepared, for example, by chlorinating 2-t-butyl-4-(3-hydroxypropyl)-6-methylphenol which is a p-hydroxyphenylalkanol described in Japanese Patent No. 4013810 with thionyl chloride.

It is preferred that the antioxidant additionally comprises a compound represented by formula (II) (hereinafter sometimes referred to as a "compound (II)") in addition to the compound (III). The processing stability of resins such as thermoplastic polymers is further improved when the antioxidant comprises the compound (II) in addition to the compound (III).

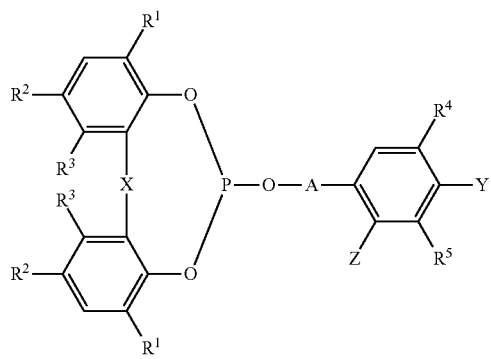

(II)

In formula (II), $R^1$, $R^2$, $R^4$ and $R^5$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms or a phenyl group.

Examples of the alkyl group having 1 to 8 carbon atoms include a methyl group, an ethyl group, a n-propyl group, an i-propyl group, a n-butyl group, an i-butyl group, a sec-butyl group, a t-butyl group, a t-pentyl group, an i-octyl group, a t-octyl group, and a 2-ethylhexyl group. Examples of the cycloalkyl group having 5 to 8 carbon atoms include a cyclopentyl group, a cyclohexyl group, a cycloheptyl group, and a cyclooctyl group. Examples of the alkylcycloalkyl group having 6 to 12 carbon atoms include a 1-methylcyclopentyl group, a 1-methycyclohexyl group, and a 1-methyl-4-i-propylcyclohexyl group. Examples of the aralkyl group having 7 to 12 carbon atoms include a benzyl group, an α-methylbenzyl group and an α,α-dimethylbenzyl group.

In formula (II), $R^1$, $R^2$, and $R^4$ are each preferably an alkyl group having 1 to 8 carbon atoms, a cycloalkyl group having 5 to 8 carbon atoms, or an alkylcycloalkyl group having 6 to 12 carbon atoms. $R^1$ and $R^4$ are each more preferably a t-alkyl group such as a t-butyl group, a t-pentyl group and a t-octyl group, a cyclohexyl group or a 1-methylcyclohexyl group. $R^2$ is more preferably an alkyl group having 1 to 5 carbon atoms such as a methyl group, an ethyl group, a n-propyl group, an i-propyl group, a n-butyl group, an i-butyl group, a sec-butyl group, a t-butyl group or a t-pentyl group, and still more preferably, a methyl group, a t-butyl group or a t-pentyl group. $R^5$ is preferably a hydrogen atom, an alkyl group having 1 to 8 carbon atoms or a cycloalkyl group having 5 to 8 carbon atoms, and more preferably a hydrogen atom, an alkyl group having 1 to 5 carbon atoms such as a methyl group, an ethyl group, a n-propyl group, an i-propyl group, a n-butyl group, an i-butyl group, a sec-butyl group, a t-butyl group or a t-pentyl group.

In formula (II), $R^3$ represents a hydrogen atom or an alkyl group having 1 to 8 carbon atoms. Examples of the alkyl group having 1 to 8 carbon atoms include the same as those described above. Preferably, $R^3$ is a hydrogen atom or an alkyl group having 1 to 5 carbon atoms, and more preferably a hydrogen atom or a methyl group.

X represents a single bond, a sulfur atom or a >CH—$R^6$ group, wherein $R^6$ represents a hydrogen atom, an alkyl group having 1 to 8 carbon atoms or a cycloalkyl group having 5 to 8 carbon atoms. Examples of the alkyl group having 1 to 8 carbon atoms and the cycloalkyl group having 5 to 8 carbon atoms which are represented by $R^6$ include the same as those described above. X is preferably a methylene group substituted by an alkyl group having 1 to 4 carbon atoms such as a methyl group, an ethyl group, a n-propyl group, an i-propyl group, a n-butyl group, an i-butyl group or a t-butyl group, or a single bond, and more preferably a single bond.

A represents an alkylene group having 1 to 8 carbon atoms, or a *—C(=O)—$R^7$— group. $R^7$ represents a single bond or an alkylene group having 1 to 8 carbon atoms, and * represents a bond on the side of oxygen. Examples of the alkylene group having 1 to 8 carbon atoms include a methylene group, an ethylene group, a propylene group, a butylene group, a pentamethylene group, a hexamethylene group, an octamethylene group and a 2,2-dimethyl-1,3-propylene group. A is preferably a propylene group. *in the *—C(=O)—$R^7$— group indicates that a carbonyl group is bonded to an oxygen atom of a phosphite group. $R^7$ is preferably a single bond or an ethylene group.

One of Y and Z represents a hydroxyl group, an alkoxy group having 1 to 8 carbon atoms or an aralkyloxy group having 7 to 12 carbon atoms, and the other represents a hydrogen atom or an alkyl group having 1 to 8 carbon atoms. Here, examples of the alkyl group having 1 to 8 carbon atoms include the same as those descried above. Examples of the aralkyloxy group having 7 to 12 carbon atoms include a benzyloxy group, an α-methylbenzyloxy group, and an α,α-dimethylbenzyloxy group.

Specifically, examples of the compound (IT) include 2,4,8,10-tetra-t-butyl-6-[3-(3-methyl-4-hydroxy-5-t-butylphenyl)propoxy]dibenzo[d,f][1,3,2]dioxaphosphepin, 6-[3-(3,5-di-t-butyl-4-hydroxyphenyl)propoxy]-2,4,8,10-tetra-t-butyldibenzo[d,f][1,3,2]dioxaphosphepin, 6-[3-(3,5-di-t-butyl-4-hydroxyphenyl)propoxy]-4,8-di-t-butyl-2,10-dimethyl-12H-dibenzo[d,g][1,3,2]dioxaphosphocin, 6-[3-(3,5-di-t-butyl-4-hydroxyphenyl)propionyloxy]-4,8-di-t-butyl-2,10-dimethyl-12H-dibenzo[d,g][1,3,2]dioxaphosphocin. These compounds may be used alone or used in combination of two or more. Among these, the compound (II) is preferably 2,4,8,10-tetra-t-butyl-6-[3-(3-methyl-4-hydroxy-5-t-butylphenyl)propoxy]dibenzo [d,f][1,3,2]dioxaphosphepin, for the viewpoint of improving the processing stability of resins such as thermoplastic polymers.

A commercially available product can be used for the compound (II). SUMILIZER (registered trademark) GP (manufactured by SUMITOMO CHEMICAL COMPANY, LIMITED) is given as an example of the commercially available product.

In the case where the antioxidant of the present invention comprises the compound (II) and the compound (III), the content of the compound (III) is preferably 0.005 to 10 parts by mass, more preferably 0.005 to 5 parts by mass, further preferably 0.005 to 2 parts by mass, and particularly preferably 0.01 to 2 parts by mass, based on 100 parts by mass of the compound (II). When the content of the compound (III) is within the aforementioned range, the processing stability of resins such as thermoplastic polymers is further improved.

In the antioxidant according to the present invention, in liquid chromatography measurement under the following measurement conditions, the area of the compound (III) is preferably 0.01 to 5, more preferably 0.01 to 2, particularly preferably 0.1 to 2, given that the area of the compound (II) is 100.

<Measurement Conditions>
Column: Sumipax ODS A-212 (6 mm φ×150 mm, diameter of filler: 5 μm)
Column temperature: 40° C.
Mobile Phase:
 (Liquid A) 0.1 mass % of ammonium acetate/water
 (Liquid B) 0.1 mass % of ammonium acetate/methanol
Mobile phase gradient: 0→20 minutes (Liquid A: 20→0 mass % (1 mass %/minute), Liquid B: 80→100 mass % (1 mass %/minute)), 20→45 minutes (Liquid A: 0 mass %, Liquid B: 100 mass %)
Flow rate: 1.0 mL/minute
Detection method: UV (280 nm)
Sample concentration: 5 mg/mL
Injection amount: 10 μL When the area of the compound (III) with respect to 100 of the area of the compound (II) is within the aforementioned range, the processing stability of resins such as thermoplastic polymers is further improved.

The antioxidant of the present invention may comprise an additive within the range in which the effect of the present invention is not inhibited. Examples of the additive include a UV absorber, a light stabilizer, an antioxidant, a metal-inactivating agent, a nucleating agent, a lubricant, an anti-static agent, a flame retardant, a filler, a pigment, a plasticizer, a flame retardant, an anti-blocking agent, a surfactant, a processing aid, a foaming agent, an emulsifier, a glazing agent, a neutralizing agent such as calcium stearate, hydrotalcite, and a binder.

The antioxidant of the present invention preferably comprises the compound (II) and the compound (III) in the total amount of 90 parts by mass or more, more preferably 95 parts by mass or more, further preferably 98 parts by mass or more, and particularly preferably 99 parts by mass or more, based on 100 parts by mass of the antioxidant. When the antioxidant of the present invention does not comprise the compound (II), it is preferred that the content of the compound (III) is within the range described above.

The form of the antioxidant of the present invention is not especially limited, but is preferably in a powdered, granular, pellet-like or flaky form.

When the antioxidant of the present invention comprises the compound (II) and the compound (III), the antioxidant of the present invention can be produced, for example, by mixing the compound (II) and the compound (III). A mixing method using a known mixer such as a Henschel mixer, a super mixer or a high-speed mixer is given as the mixing method. Specific examples of the mixing method include a method in which the compound (II) and the compound (III) are compressively granulated by a compression granulator such as a roller compactor to obtain a flaky antioxidant, a method in which the compounds (II) and (III) are melt extruded by a single or multiple screw extruder to obtain a pellet-like antioxidant, a method in which the compounds (II) and (III) are extruded by a semi-dry extruder such as a disk pelleter to obtain a pellet-like antioxidant, a method in which the compounds (II) and (III) are mixed with a binder to obtain a granular antioxidant, and a method in which the compounds (II) and (III) are dissolved or dispersed in a solvent and then the solvent is removed under reduced pressure. Examples of the solvent include aromatic hydrocarbons having 6 to 12 carbon atoms, alcohols having 1 to 8 carbon atoms, and aliphatic nitriles having 2 to 3 carbon atoms. When an additive is added to the antioxidant of the present invention, it may be mixed together with the compound (II) and the compound (III).

The antioxidant of the present invention can improve the stability of resins such as thermoplastic polymers by suppressing yellowing or thermal deterioration of resins. Therefore, the present invention provides a thermoplastic polymer composition comprising the antioxidant of the present invention and a thermoplastic polymer.

There is no limitation to the thermoplastic polymers of which the stability can be improved by the antioxidant of the present invention, and examples of the thermoplastic polymers include the following compounds. The thermoplastic polymers may be alone or a mixture of two or more.

propylene-based resins; ethylene-based resins such as a polyethylene, an ethylene/α-olefin copolymer, an ethylene/ethyl acrylate copolymer resin, an ethylene/vinyl acetate copolymer resin, an ethylene/vinyl alcohol copolymer resin and an ethylene/methyl methacrylate copolymer; methylpentene polymers; styrene-based resins such as a poly(p-methylstyrene), a poly (α-methylstyrene), an acrylonitrile/styrene copolymer resin, an acrylonitrile/butadiene/styrene copolymer resin, a special acrylic rubber/acrylonitrile/styrene copolymer resin, an acrylonitrile/chlorinated polyethylene/styrene copolymer resin and a styrene/butadiene copolymer; halogenated polyolefins such as a chlorinated polyethylene, a polychloroprene, a chlorinated rubber, a polyvinyl chloride and a polyvinylidene chloride; acrylic resins such as an acrylic resin and a methacrylic resin; fluorine resins; polyacetals; grafted polyphenylene ether resins; polyphenylene sulfide resins; polyamides; polyester resins such as a polyethylene terephthalate and a polybutylene terephthalate; polycarbonates; polysulfones; polyetheretherketones; polyethersulfones; aromatic polyester resins; diallylphthalate prepolymers; silicone resins; and elastomers such as a 1,2-polybutadiene, a polyisoprene and a butadiene/acrylonitrile copolymer.

In the present invention, the thermoplastic polymer is preferably polyolefin-based resins. Among these, ethylene-based resins and propylene-based resins are more preferred, and ethylene-based resins are further preferred.

Examples of the ethylene/α-olefin copolymer include an ethylene-propylene copolymer, an ethylene-1-butene copolymer, an ethylene-4-methyl-1-pentene copolymer, an ethylene-1-hexene copolymer, an ethylene-octene copolymer, and an ethylene-1-decene copolymer. Ethylene-based resins such as a polyethylene and an ethylene/α-olefin copolymer are classified into a low density polyethylene (LDPE) having a density of 0.914-0.925 (g/cm$^3$), a mid-density polyethylene (MDPE) having a density of 0.925-0.94 (g/cm$^3$) or a high density polyethylene (HDPE) having a density of 0.94-0.96 (g/cm$^3$) according to JIS K6760. Among LDPEs, the ethylene/α-olefin copolymer is sometimes referred to as a linear low density polyethylene (LLDPE). The LLDPE is particularly preferred for the thermoplastic polymer in the present invention. The ethylene/α-olefin copolymer preferably contains 50 parts by mass or more of a repeating unit having a polyethylene crystalline structure and derived from ethylene.

The α-olefin in the ethylene/α-olefin copolymer is preferably an α-olefin having 4 to 20 carbon atoms. Examples of the α-olefin include 1-butene, 1-pentene, 1-hexen, 1-heptene, 1-octene, 1-nonene, 1-decene, 1-dodecene, 4-methyl-1-pentene, 4-methyl-1-hexene, vinylcyclohexane, vinylcyclohexene, styrene, norbornene, butadiene and isoprene. 1-butene, 1-hexene, 4-methyl-1-pentene and 1-octene are preferred. These α-olefins may be used alone or used in combination of two or more.

The ethylene-based resin is obtained, for example, by polymerizing ethylene and an α-olefin having 3 to 18 carbon atoms in the presence of a catalyst such as a metallocene-based catalyst or a Ziegler-Natta catalyst. Examples of the polymerization method include a slurry polymerization method carried out in a solvent such as a hydrocarbon solvent, a solvent polymerization method, a liquid-phase polymerization method carried out with no solvent, a gas-phase polymerization method, and a liquid phase-gas phase polymerization method in which these methods are carried out continuously.

A propylene-based resin in the present specification means a polyolefin-based resin having structural units derived from propylene. Examples of the propylene-based resin include a crystalline propylene homopolymer, a propylene-ethylene random copolymer, a propylene-α-olefin random copolymer, a propylene-ethylene-α-olefin copolymer, and a polypropylene-based block copolymer. A crystalline propylene homopolymer and a polypropylene-based block copolymer are preferred, and a polypropylene-based block copolymer is more preferred.

The propylene-based resins used for the thermoplastic polymer may be alone or in combination of two or more.

Examples of the polypropylene-based block copolymer include a polypropylene-based block copolymer comprising a propylene homopolymer or a copolymer component consisting mainly of propylene, and a copolymer component consisting of propylene and at least one selected from the group consisting of ethylene and α-olefin.

The α-olefin which the propylene-based resin contains is usually an α-olefin having 4 to 12 carbon atoms. Examples of the α-olefin include 1-butene, 1-pentene, 1-hexene, 4-methyl-1-pentene, 1-octene and 1-decene. 1-butene, 1-hexene and 1-octene are preferred.

Examples of the propylene-α-olefin random copolymer include a propylene-1-butene random copolymer, a propylene-1-hexene random copolymer, and a propylene-1-octene random copolymer.

Examples of the propylene-ethylene-α-olefin copolymer include a propylene-ethylene-1-butene copolymer, a propylene-ethylene-1-hexene copolymer, and a propylene-ethylene-1-octene copolymer.

Examples of the copolymer component mainly consisting of propylene in the polypropylene-based block copolymer comprising a propylene homopolymer or a copolymer component consisting mainly of propylene, and a copolymer component consisting of propylene and at least one selected from the group consisting of ethylene and α-olefin include a propylene-ethylene copolymer component, a propylene-1-butene copolymer component, and a propylene-1-hexene copolymer component. Examples of the copolymer component consisting of propylene and at least one selected from the group consisting of ethylene and α-olefin include a propylene-ethylene copolymer component, a propylene-ethylene-1-butene copolymer component, a propylene-ethylene-1-hexene copolymer component, a propylene-ethylene-1-octene copolymer component, a propylene-1-butene copolymer component, a propylene-1-hexene copolymer component, and a propylene-1-octene copolymer component. The content of a component derived from ethylene and α-olefin in the component consisting of propylene and at least one selected from the group consisting of ethylene and α-olefin is usually 0.01 to 20% by mass.

Examples of the polypropylene-based block copolymer comprising a propylene homopolymer or a copolymer component consisting mainly of propylene, and a copolymer component consisting of propylene and at least one selected from the group consisting of ethylene and α-olefin include a propylene-ethylene block copolymer, a (propylene)-(propylene-ethylene) block copolymer, a (propylene)-(propylene-ethylene-1-butene) block copolymer, a (propylene)-(propylene-ethylene-1-hexene) block copolymer, a (propylene)-(propylene-1-butene) block copolymer, a (propylene)-(propylene-1-hexene) block copolymer, a (propylene-ethylene)-(propylene-ethylene-1-butene) block copolymer, a (propylene-ethylene)-(propylene-ethylene-1-hexaene) block copolymer, a (propylene-ethylene)-(propylene-1-butene) block copolymer, a (propylene-ethylene)-(propylene-1-hexene) block copolymer, a (propylene-1-butene)-(propylene-ethylene) block copolymer, a (propylene-1-butene)-(propylene-ethylene-1-butene) block copolymer, a (propylene-1-butene)-(propylene-ethylene-1-hexene) block copolymer, a (propylene-1-butene)-(propylene-1-butene) block copolymer, and a (propylene-1-butene)-(propylene-1-hexene) block copolymer.

Examples of the production method for the propylene-based resin include a slurry polymerization method carried out in a solvent such as a hydrocarbon solvent, a solvent polymerization method, a liquid-phase polymerization method carried out with no solvent, a gas-phase polymerization method, and a liquid phase-gas phase polymerization method in which these methods are carried out continuously. These production methods may be a batch process or a continuous process. They may be a method of producing at a single step or a method of producing at a multiple-step of two or more steps. The polypropylene-based block copolymer is produced, for example, by a multiple-step production method in which each constituent component is individually produced.

A thermoplastic polymer in the present invention preferably has a melt index (MI) value of 0.01 to 100 g/10 minutes, and more preferably 0.01 to 10 g/10 minutes. An ethylene-based resin preferably has a melt index of 0.01 g/10 minutes or more and less than 10 g/10 minutes. A propylene-based resin preferably has MI value of 0.01 to 100 g/10 minutes, from the viewpoint of processing moldability.

Examples of methods for obtaining a thermoplastic polymer composition by mixing the antioxidant of the present invention and a thermoplastic polymer include a method in which the thermoplastic polymer and the antioxidant of the present invention are dry blended, followed by melt-extrusion by an extruder, a method in which a solution obtained by dissolving the antioxidant of the present invention in a solvent is mixed with the thermoplastic polymer, followed by removing the solvent, and a method in which a solution obtained by dissolving the antioxidant of the present invention in a solvent and a solution obtained by dissolving the thermoplastic polymer in the solvent are mixed, followed by removing the solvent. Examples of the solvent include cyclohexane and the like. It is preferred to use a thermoplastic polymer solution after solution polymerization without any change as the solution in which the thermoplastic polymer is dissolved in the solvent.

The thermoplastic polymer composition of the present invention preferably comprises the antioxidant in an amount of 0.005 to 5 parts by mass, more preferably 0.01 to 5 parts by mass, further preferably 0.01 to 1 part by mass, and particularly preferably 0.03 to 1 part by mass, based on 100 parts by mass of the thermoplastic polymer.

The stability of resins can be evaluated by measuring the yellowness index (YI) value and the melt index (MI) value of the molded thermoplastic polymer composition obtained by kneading the thermoplastic polymer composition and molding it in a pellet form or the like. The antioxidant of the present invention is particularly suitable as a processing stabilizer for improving the stability of resins during processing. The processing stability of resins can be evaluated by measuring the MI value of the resins before and after processing.

Specifically, the stability of resins can be evaluated, for example, by the following method.

The thermoplastic polymer and the antioxidant are dry blended. The resultant thermoplastic polymer composition is kneaded using a 30 mm diameter double screw extrusion molding machine under an atmosphere of air, at 190° C. and a screw rotation number of 80 rpm to obtain pellets (1). The obtained pellets (1) are kneaded using a 30 mm diameter single screw extrusion molding machine under an atmosphere of air, at 230° C. and a screw rotation number of 50 rpm to obtain pellets (2). Kneading and extrusion molding using this single screw extrusion molding machine are repeated 5 times to obtain pellets (3). With regard to the obtained pellets (3), YI values are measured according to the optical property test method for plastics defined in JIS K 7105, using a color-difference meter CM-3500d manufactured by KONICA MINOLTA Co. Ltd. The lower the YT value, the lower the yellowness, and the higher the stability of resins. In addition, MI values are measured at 190° C. using a load of 21.18 N (2.16 kg), according to the method defined in JIS K7210-1995. For example, in the ethylene-based resin, the higher the MI value, the higher the stability. On the other hand, in the propylene-based resin, the lower the MI value, the higher the stability. In particular, the ethylene-based resin with small changes in MI value when molding was repeatedly performed 5 times at a temperature of 200° C. or more using the extrusion molding machine has high stability.

EXAMPLES

The present invention will hereinafter be described in more detail. Parts and % are based on mass unless otherwise particularly stated.

Specifically, the following compounds were respectively used in Examples and Comparative Examples.

Thermoplastic Polymer (A):

Linear low density polyethylene resin (LLDPE) (MT value: 1.05 g/10 minutes, manufactured by SUMITOMO CHEMICAL COMPANY, LIMITED)

Compound (I)-A:

n-octadecyl-3-(4-hydroxy-3,5-di-t-butylphenyl) propionate

Compound (II)-A:

2,4,8,10-tetra-t-butyl-6-[3-(3-methyl-4-hydroxy-5-t-butylphenyl)propoxy]dibenzo[d,f][1,3,2]dioxaphosphepin (SUMILIZER (registered trademark) GP, manufactured by SUMITOMO CHEMICAL COMPANY, LIMITED)

Compound (III)-A:

2-t-butyl-4-(3-chloropropyl)-6-methylphenol

<Production of Compound (III)-A>

According to the method described in the Japanese patent No. 4013810, 2-t-butyl-4-(3-hydroxypropyl)-6-methylphenol was synthesized. 250 g of 2-t-butyl-4-(3-hydroxypropyl)-6-methylphenol, 9 g of pyridine and 650 mL of toluene were mixed, and then 171 g of thionyl chloride was added dropwise to the obtained mixture, followed by mixing at 78° C. for 3 hours while stirring. After the obtained mixture was cooled to room temperature, the mixture was separating washed with water and 5% aqueous solution of sodium hydrogen carbonate, and then the solvent was distilled off under reduced pressure to obtain a crude product. The obtained crude product was purified by silica gel column chromatography (solvent: hexane, chloroform) to obtain 2-t-butyl-4-(3-chloropropyl)-6-methylphenol. It was confirmed, by $^1$H-NMR, that the obtained compound was 2-t-butyl-4-(3-chloropropyl)-6-methylphenol.

Example 1

100 parts by mass of a thermoplastic polymer (A), 0.1 parts by mass of the compound (III)-A and 0.05 parts by mass of calcium stearate were dry blended, and then further kneaded using a 30 mm diameter twin-screw extrusion molding machine (NAS30 type extruder, manufactured by Nakatani Co., Ltd.) under an atmosphere of air, at 190° C. and a screw rotation number of 80 rpm to obtain pellets (1-1) as a thermoplastic polymer composition. The obtained pellets (1-1) were kneaded using a 30 mm diameter single screw extrusion molding machine (VS30-28 type extruder, manufactured by TANABE PLASTICS MACHINERY CO., LTD.) under an atmosphere of air, at 230° C. and a screw rotation number of 50 rpm to obtain pellets (2-1). Kneading and extrusion molding using this single screw extrusion machine were further repeated 5 times to obtain pellets. Each pellets obtained after repeating once, 3 times or 5 times and pellets (2-1) was filled in a plastic bag, and YI values of those pellets were measured according to the optical property test method for plastics defined in JIS K 7105, using a color-difference meter CM-3500d manufactured by KONICA MINOLTA Co. Ltd. In addition, MI values of the pellets obtained after repeating 5 times were measured at 190° C. using a load of 21.18 N (2.16 kg), according to the method defined in JIS K7210-1995, by means of a melt indexer (manufactured by TECHNO SEVEN CO., LTD., type L246-3537) to evaluate the processing stability of the polymer composition. The results are shown in Table 1.

Comparative Example 1

A thermoplastic polymer composition was prepared in the same manner as in Example 1, except that the compound (I)-A was used instead of the compound (III)-A. Processing stability and yellowing of the obtained polymer composition were evaluated. The results are shown in Table 1.

TABLE 1

| | anti-oxidant | MI value g/10 min. | YI value pellets (2-1) | repeat 1 time | repeat 3 times | repeat 5 times |
|---|---|---|---|---|---|---|
| Example 1 | compound (III)-A | 0.38 | −0.9 | −0.3 | 1.7 | 2.5 |
| Comp. Example 1 | compound (I)-A | 0.37 | −0.5 | 1.7 | 5.4 | 7.9 |

Example 2

<Production of Antioxidant (A)>
A compound (II)-A and a compound (III)-A were mixed at a ratio shown in Table 2 to obtain an antioxidant (A). Liquid chromatography measurement was performed on the antioxidant (A) under the following measurement conditions. The area of the compound (III)-A given that the area of the compound (II)-A is 100 is shown in Table 2.
Liquid Chromatography (LC) Measurement Conditions
LC measuring device: Shimadzu Corporation LC-10Avp
Column: Sumipax ODS A-212 (6 mm φ×150 mm, diameter of filler: 5 µm)
Column temperature: 40° C.
Mobile Phase:
(Liquid A) 0.1 mass % of ammonium acetate/water
(Liquid B) 0.1 mass % of ammonium acetate/methanol
Mobile phase gradient: 0→20 minutes (Liquid A: 20→0 mass % (1 mass %/minute), Liquid B: 80→100 mass % (1 mass %/minute)), 20→45 minutes (Liquid A: 0 mass %, Liquid B: 100 mass %)
Flow rate: 1.0 mL/minute
Detector: SPD-10Avp
Detection method: UV (280 nm)
Sample concentration: 5 mg/mL
Injection amount: 10 µL
<Preparation of Thermoplastic Polymer Composition>
100 parts by mass of a thermoplastic polymer (A), 0.1 parts by mass of an antioxidant (A), and 0.05 parts by mass of calcium stearate were dry blended, and then further kneaded using a 30 mm diameter twin-screw extrusion molding machine (NAS30 type extruder, manufactured by Nakatani Co., Ltd.) under an atmosphere of air, at 190° C. and a screw rotation number of 80 rpm to obtain pellets (1-2) as a thermoplastic polymer composition. The obtained pellets (1-2) were kneaded using a 30 mm diameter single screw extrusion molding machine (VS30-28 type extruder, manufactured by TANABE PLASTICS MACHINERY CO., LTD.) under an atmosphere of air, at 230° C. and a screw rotation number of 50 rpm to obtain pellets (2-2). Kneading and extrusion molding using this single screw extrusion machine were further repeated 5 times to obtain pellets (3-2). MI values of the pellets (3-2) were measured at 190° C. using a load of 21.18 N (2.16 kg), according to the method defined in JIS K7210-1995, by means of a melt indexer (manufactured by TECHNO SEVEN CO., LTD., type L246-3537) to evaluate the processing stability of the polymer composition. The results are shown in Table 2.

Examples 3-6, Comparative Example 2

As to Examples 3-6, an antioxidant and a thermoplastic polymer composition were prepared in the same manner as in Example 2, except that the numbers of parts in Table 2 were used for the compound (II)-A and the compound (III)-A, and the area and processing stability of the polymer composition were evaluated. Comparative Example 2 corresponds to example without using an antioxidant. The results of Examples 3-6 and Comparative Example 2 are shown in Table 2.

TABLE 2

|  | antioxidant mixing ratio | | | | stability of resins MI value | |
|---|---|---|---|---|---|---|
|  | parts by mass[1)] | | area[2)] | | Measured value (g/10 min.) | Relative value with Comp. Ex. 1 being 100 |
|  | compound (II)-A | compound (III)-A | compound (II)-A | compound (III)-A | | |
| Example 2 | 80 | 20 | 100 | 22.4 | 0.40 | 108 |
| Example 3 | 98 | 2 | 100 | 1.8 | 0.44 | 119 |
| Example 4 | 99.5 | 0.5 | 100 | 0.5 | 0.44 | 119 |
| Example 5 | 99.95 | 0.05 | 100 | 0.2 | 0.44 | 119 |
| Example 6 | 99.99 | 0.01 | 100 | 0.05 | 0.43 | 116 |
| Comp. Example 2 | 0 | 0 | — | — | 0.12 | 32 |

[1)]Given that the total amount of compound (II)-A and compound (III)-A is 100.
[2)]Calculated given that the area of compound (II)-A is 100.

As shown in Table 1, even after kneading and extrusion molding were repeated, the antioxidant composed of the compound represented by formula (III) according to the present invention had a low level of YI value and a higher effect of suppressing yellowing as compared with the conventional antioxidant [(I)-A]. In addition, MI value measured after kneading and extrusion molding were repeated was high, and it was confirmed that the antioxidant of the present invention has an excellent processing stability of resin. Moreover, as shown in Table 2, it was confirmed that the stability of resin was further improved when the antioxidant comprises the compound represented by formula (II).

INDUSTRIAL APPLICABILITY

According to the present invention, an antioxidant which further improves the stability of resins can be provided.

The invention claimed is:

1. An antioxidant mixture comprising a compound represented by formula (III):

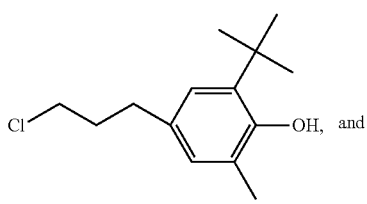

a compound represented by formula (II):

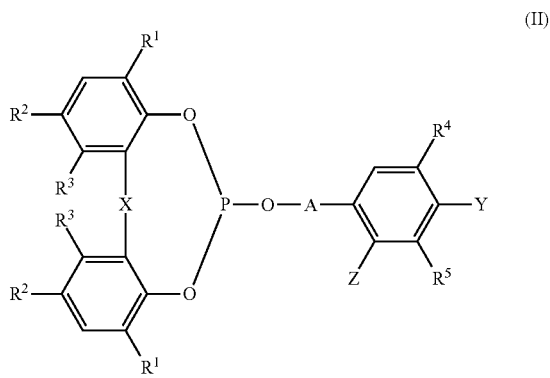

wherein $R^1$, $R^2$, $R^4$ and $R^5$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms or a phenyl group; $R^3$ represents a hydrogen atom or an alkyl group having 1 to 8 carbon atoms; X represents a single bond, a sulfur atom or a >CH—$R^6$ group, where $R^6$ represents a hydrogen atom, an alkyl group having 1 to 8 carbon atoms or a cycloalkyl group having 5 to 8 carbon atoms; A represents an alkylene group having 1 to 8 carbon atoms or a *—C(=O)—$R^7$— group, where $R^7$ represents a single bond or an alkylene group having 1 to 8 carbon atoms, and * represents a bond on the side of oxygen; one of Y and Z represents a hydroxyl group, an alkoxy group having 1 to 8 carbon atoms or an aralkyloxy group having 7 to 12 carbon atoms, and the other represents a hydrogen atom or an alkyl group having 1 to 8 carbon atoms.

2. The antioxidant mixture according to claim 1, comprising the compound represented by formula (III) in an amount of 0.005 to 10 parts by mass based on 100 parts by mass of the compound represented by formula (II).

3. The antioxidant mixture according to claim 1, wherein the area of the compound represented by formula (III) is 0.01 to 5 given that the area of the compound represented by formula (II) is 100 in liquid chromatography measurement under the following measurement conditions: a 6 mm φ×150 mm column with a diameter of filler of 5 μm, a column temperature of 40° C., mobile phase of 0.1 mass % of ammonium acetate/water (liquid A) and 0.1 mass % of ammonium acetate/methanol (liquid B), where the mobile phase gradient is 0→20 minutes (liquid A: 20→0 mass % (1 mass %/minute), and liquid B: 80→100 mass % (1 mass %/minute)), 20→45 minutes (liquid A: 0 mass %, liquid B: 100 mass %), the flow rate is 1.0 mL/minute, the detection method is UV (280 nm), the sample concentration is 5 mg/mL and the injection amount is 10 μL.

4. The antioxidant mixture according to claim 1, wherein the total amount of the compound represented by formula (II) and the compound represented by formula (III) is 90 parts by mass or more based on 100 parts by mass of the antioxidant mixture.

5. A thermoplastic polymer composition comprising the antioxidant mixture according to claim 1, and a thermoplastic polymer.

6. The thermoplastic polymer composition according to claim 5, comprising the antioxidant mixture in an amount of 0.005 to 5 parts by mass based on 100 parts by mass of the thermoplastic polymer.

7. The thermoplastic polymer composition according to claim 5, wherein the thermoplastic polymer is a polyolefin.

* * * * *